Dec. 2, 1969   H. WINTERHOFF   3,482,158
METHOD AND NUCLEAR RESONANCE MAGNETOMETER
APPARATUS FOR MEASURING SMALL DIFFERENCES
OF MAGNETIC FIELD
Filed Feb. 8, 1967   3 Sheets-Sheet 1

Inventor:
Horst Winterhoff
BY Spencer & Kaye
Attorneys

Inventor:
Horst Winterhoff
BY Spencer & Kaye
Attorneys

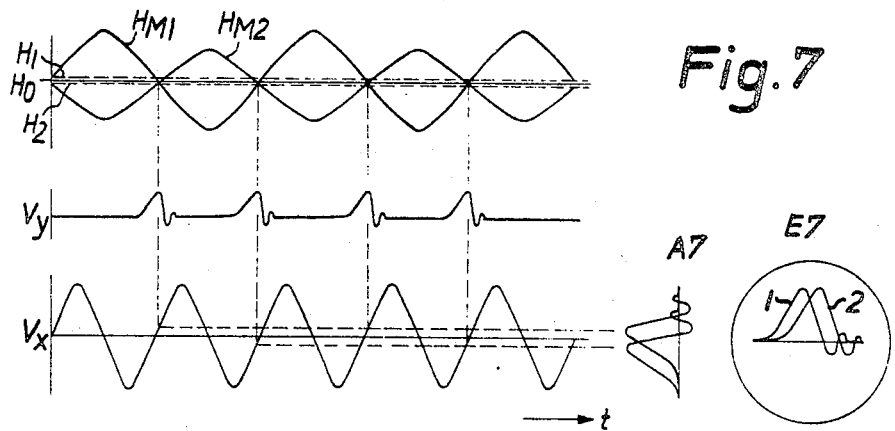
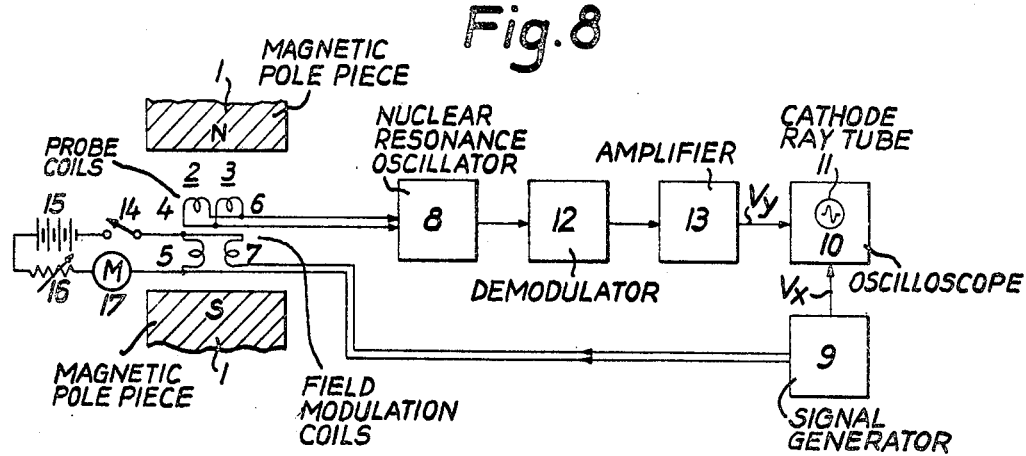

United States Patent Office 3,482,158
Patented Dec. 2, 1969

3,482,158
METHOD AND NUCLEAR RESONANCE MAGNETOMETER APPARATUS FOR MEASURING SMALL DIFFERENCES OF MAGNETIC FIELD
Horst Winterhoff, Berlin, Germany, assignor to Licentia Patent-Verwaltungs-G.m.b.H., Frankfurt am Main, Germany
Filed Feb. 8, 1967, Ser. No. 614,596
Claims priority, application Germany, Feb. 8, 1966, L 52,822
Int. Cl. G01n 27/78
U.S. Cl. 324—.5                8 Claims

ABSTRACT OF THE DISCLOSURE

The difference of magnetic force between two adjacent locations is measured with a nuclear resonance magnetometer having two probe coils by (a) positioning each of the probe coils in a corresponding one of the two locations; (b) positioning each of two magnetic field modulating coils in a corresponding one of the two locations; (c) energizing the magnetic field modulating coils for producing two magnetic modulation fields which are superimposed on the magnetic field to be measured and which are 180° out of phase with each other; (d) applying the output of the nuclear resonance magnetometer to the deflection plates of a cathode ray tube; (e) synchronizing the sweep frequency of the cathode ray tube with the frequency of the magnetic modulation fields; and (f) determining the difference of magnetic force between the two locations by measuring the distance between two adjacent waveforms on the cathode ray tube. The difference of magnetic force is also measured by applying a variable D.C. bias current to one of the two magnetic field modulating coils, varying the bias current to produce coincidence between two adjacent waveforms on the cathode ray tube, and then measuring the amount of bias current required to produce coincidence.

BACKGROUND OF THE INVENTION

This invention relates to the measurement of magnetic fields with nuclear resonance magnetometers, which are known per se in the art, as disclosed in my copending application Ser. No. 579,246, which was filed on Sept. 14, 1966, for a Method and Apparatus for Magnetic Field Measurement, and also in my copending application Ser. No. 571,479, which was filed on Aug. 10, 1966, for a Magnetic Field Meter. As described in the above-noted copending applications, the prior art nuclear resonance magnetometer contain a measuring probe coil which forms part of the resonant circuit for a variable frequency oscillator. The measuring probe coil contains a suitable nuclear probe substance which is inserted into a magnetic field at right angles to the field. The frequency of the oscillator is then varied until resonant absorption occurs, as indicated by a dip in the amplitude of oscillation, and the frequency at which resonant absorption occurs is directly proportional to the strength of the magnetic field acting on the nuclear probe substance. In this manner, the phenomenon of nuclear resonance has been utilized in the past to measure the strength of magnetic fields.

In the application of nuclear resonance magnetometers, it is often desirable to test the uniformity of magnetic fields. The magnetic field uniformity of research electromagnets has previously been tested by inserting the measuring probe of a nuclear resonance magnetometer and a field modulating coil in a definite manner into the air gap of the magnet, for example into the center of the air gap, and displacing this probe parallel to the plane of the magnetic pole pieces. This method of measuring is time-consuming, however, and requires that the magnetic field be stable in time, which under certain circumstances is not always possible. An expensive frequency meter is further required for accurate measurement. Moreover, this manual method of measuring requires from ½ to 1 minute per point to be measured, so that the total measuring action for field uniformity requires up to 15 minutes or more.

FIGURES 1 and 2 show two waveform displays E1 and E2 appearing on the screen of a cathode ray tube coupled to the output of a nuclear resonance magnetometer utilized in connection with the above-mentioned method of measuring. FIGURE 1 shows the creation of a signal S in the center of the display when the magnetic force $H_1$ to be measured is equal to a frequency preset in the nuclear resonance magnetometer, this frequency being identical to the magnetic force $H_0$. The magnetic modulation field $H_M$ superposed on the field $H_1$ to be measured has a frequency of 50 c.p s., and the horizontal sweep voltage $V_X$ for the oscilloscope has a frequency of 100 c.p.s. Since the magnetic force $H_1$ to be measured is identical with the frequency preset in the magnetometer, equidistant spacing is produced between the resonance signals S, which are applied as vertical deflection voltages $V_Y$ to the cathode ray tube. The signal S is produced whenever the modulation field $H_M$ crosses field $H_1$ either in the increasing or decreasing direction. Since a frequency twice as high is selected for the horizontal sweep voltage $V_X$ of the cathode ray tube, the signal S appears on the cathode ray tube during each sweep.

In all figures, the waveform A on the lower right of the figure represents the combined action of the voltages $V_Y$ and $V_X$ on the deflecting plates of the cathode ray tube. This waveform is rotated by 90° in the cathode ray tube display.

The waveform display E2 according to FIGURE 2 results when a difference exists between the magnetic force $H_1$ to be measured and the frequency of the nuclear resonance magnetometer identical with $H_0$, i e., $H_0 \neq H_1$. In this case, a signal $S_1$ appears left of center on the display E2 and a second signal $S_2$ appears right of center on the display. This waveform indicates to the operator that the field $H_1$ is unequal to the magnetic force $H_0$ which is preset via the oscillator frequency of the nuclear resonance magnetometer. For purposes of alignment, the oscillator frequency of the magnetometer, and thus $H_0$, is varied to produce coincidence between signals $S_1$ and $S_2$ so that they merge into a single signal S as shown in FIGURE 1.

For a differential measure of relative field strength, two measuring probes could be employed which are constructed in the above-described manner. The two coils of the probes in this case would be fed by the same oscillator circuit of the nuclear resonance magnetometer, and a modulation field $H_M$ would be created by two corresponding field modulating coils.

FIGURE 3 shows a waveform diplay E3 resulting from application of this method, whereby two probes are used for measuring the difference between the magnetic force $H_1$ and $H_2$ with a magnetic modulation field $H_M$. In this particular example, the difference of magnetic force between $H_1$ and $H_2$ is quite small to illustrate that the above-noted differential measuring method is unsuitable for measuring very small differences of magnetic force.

As shown in FIGURE 3, upon change in the modulation field $H_M$, two resonance points of close proximity are produced, i.e., two intersections of the decreasing portion of $H_M$ with $H_0$, and two intersections of the increasing portion of $H_M$ with $H_0$. The signals occur closely together in time and therefore combine to form a single signal of greater width and amplitude. The difference in magnetic force between $H_1$ and $H_2$ is accordingly only indicated in the display as a wider line width. As suggested in FIGURE 3, no adjustment of the oscillator frequency occurs, and the signals $S_5$ and $S_6$ appear on the display E3. Because of the summation of the signals $S_1$ and $S_3$, or $S_2$ and $S_4$, respectively, the small separations between them are practically indiscernible, and since it is this separation that constitutes an indication of the difference in magnetic force, the method described above is not suitable for measuring very small differences of magnetic force.

If larger differences of magnetic force are present, it can easily be seen that a larger separation will occur between the signals $S_1$ and $S_3$, or $S_2$ and $S_4$, respectively, and that these signal pairs then no longer blend into one signal. With a sufficiently large difference in magnetic force, the separation between the signals $S_1$ and $S_3$, or $S_2$ and $S_4$, respectively, becomes large enough so that it can be measured. Thus, although the above-noted method is workable for large differences of magnetic force, it can not be used to measure small differences of magnetic force.

SUMMARY OF THE INVENTION

In accordance with this invention, a novel method and apparatus have been devised for overcoming the above-noted problems relating to the measurement of very small differences of magnetic force between two adjacent locations. In this invention, two probe coils which are part of the resonant circuit of a nuclear resonance magnetometer oscillator are placed in the magnetic field at the measuring locations. Two field modulating coils are also disposed at the measuring locations. The alternating magnetic fields of the two field modulating coils which are superimposed on the magnetic field to be measured, are in phase opposition to each other. According to a further embodiment of the invention, one of the field modulating coils is additionally influenced by an adjustable direct current bias source or by a static magnetic field which can be adjusted in amplitude by means of a correcting element. In the latter embodiment, it is preferable to measure the direct current or the static field, respectively, by means of an instrument which is directly calibrated in magnetic force values.

BRIEF DESCRIPTION OF THE DRAWINGS

FIGURE 7 is a fourth set of waveforms illustrating the measurement method and apparatus of this invention.

FIGURE 8 is a partial schematic diagram of one illustrative apparatus of this invention.

DESCRIPTION OF THE PREFERRED EMBODIMENTS

Figure 1:
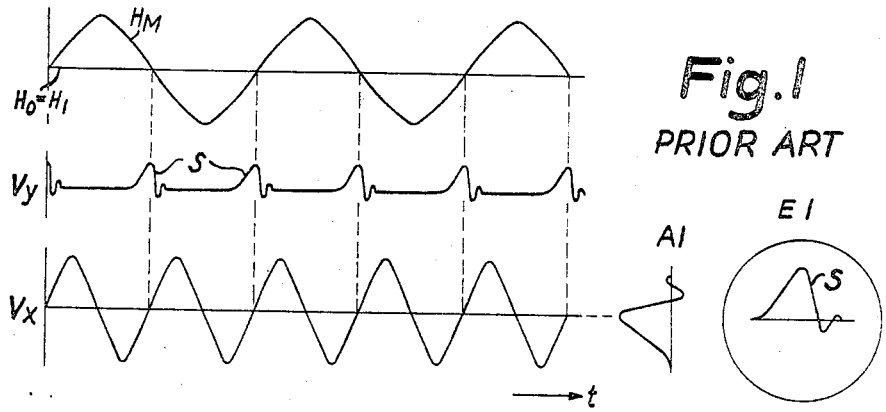
FIGURE 1 is a set of waveforms illustrating the operation of a prior art nuclear resonance magnetometer utilizing a single probe coil.
Figure 2:
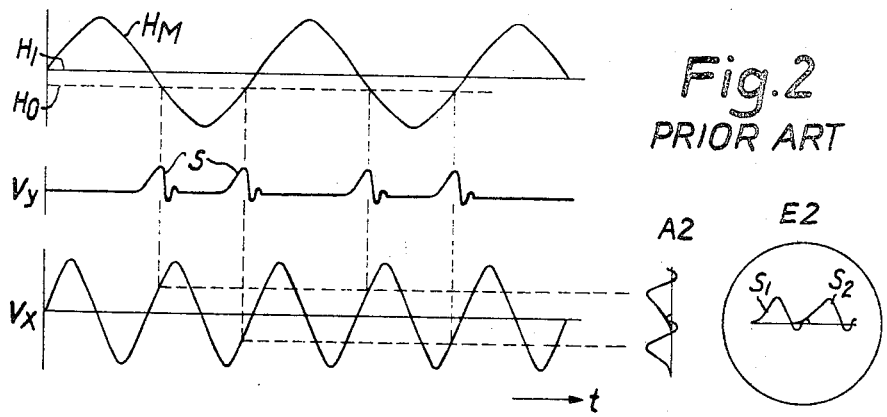
FIGURE 2 is another set of waveforms illustrating the operation of a prior art nuclear resonance magnetometer utilizing a single probe coil.
Figure 3:
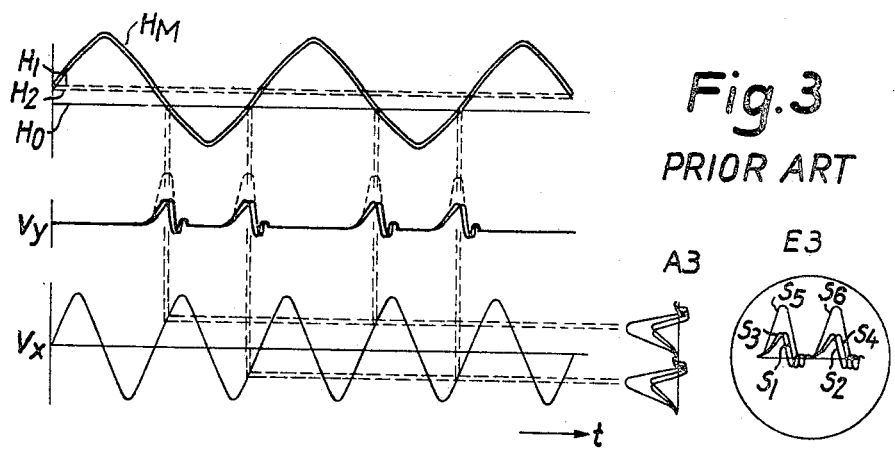
FIGURE 3 is a set of waveforms illustrating the operation of a prior art nuclear resonance magnetometer utilizing two probe coils.

As explained for differential measuring with two probes with reference to FIGURE 3, the signals $S_1$, $S_3$, and $S_2$, $S_4$, are located so closely together, when the difference in magnetic force is very small ($\leq 10^{-5}$), that the separation between $S_1$ and $S_3$ and between $S_2$ and $S_4$ is no longer discernible.

Figure 4:
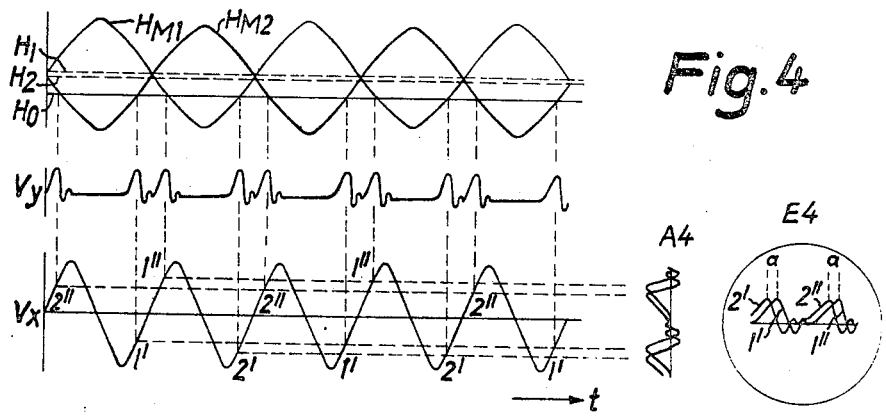
FIGURE 4 is a first set of waveforms illustrating the measurement method and apparatus of this invention.

FIGURE 4 shows the creation of the waveform display E4 with differential measuring, according to the invention, with two probes and two out-of-phase magnetic modulation fields $H_{M1}$ and $H_{M2}$, wherein the nuclear resonance magnetometer is tuned to a frequency which corresponds to the magnetic force $H_0$. Resonance signals are always emitted when the modulation fields $H_{M1}$ and $H_{M2}$ traverse the magnetic force $H_0$. Adjacent pairs of signals $1'$, $2'$ and $1''$, $2''$ thus appear on the display E4 and are situated to the left and to the right of center on the screen, respectively. If the modulation fields $H_{M1}$ and $H_{M2}$ have the same amplitudes, as shown in FIGURE 4, the resulting separation $a$ on the display is directly proportional to the difference $H_1-H_2$. It can be seen then that a measurement of very small differences in magnetic force is possible by means of the waveform display E4 according to FIGURE 4.

Figure 5:
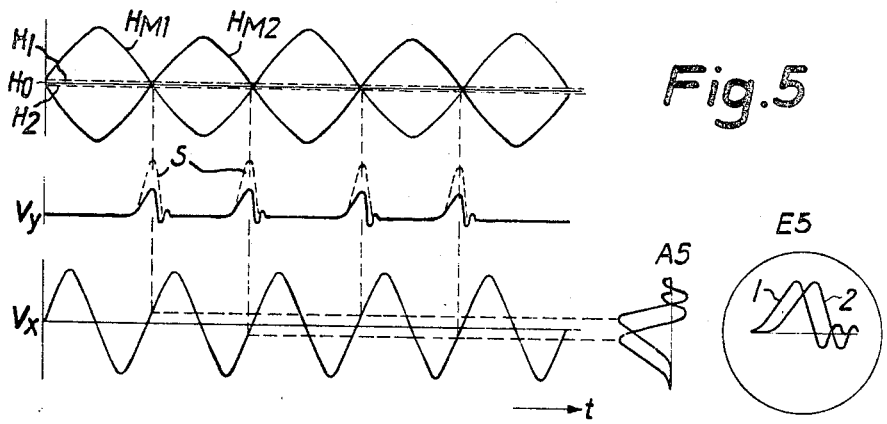
FIGURE 5 is a second set of waveforms illustrating the measurement method and apparatus of this invention.

The evaluation of the waveform display E4, however, can be made more distinct and thus easier to interpret by changing the nuclear resonance magnetometer from the setting $H_0$ shown in FIGURE 4 to the setting $H_0$ shown in FIGURE 5, i.e., placing $H_0$ between $H_1$ and $H_2$. Upon changing the nuclear resonance magnetometer from the setting shown in FIGURE 4 to the setting shown in FIGURE 5, the signals $1'$ and $1''$ and the signals $2'$ and $2''$ of FIGURE 4 will move towards each other. The variation of the nuclear resonance magnetometer is then continued until the signals $1'$, $1''$ and $2'$, $2''$ coincide. The signals $1'$ and $1''$ will then be added together as will the signals $2'$ and $2''$, and only two signals will appear on the screen with double amplitude ($1'+1''$, or $2'+2''$, respectively), which are shown as $1$ and $2$ on the waveform display E5 of FIGURE 5. The distance between the signals $1$ and $2$ in this case is still proportional to the difference of magnetic force.

The waveform display E5 according to FIGURE 5 thus results when the nuclear resonance magnetometer is tuned to the frequency identical to $H_0$ of FIGURE 5, whereby $H_0$ is centered between $H_1$ and $H_2$, and when the amplitudes of the modulation fields $H_{M1}$ and $H_{M2}$ are equal.

In contrast to the method described in connection with FIGURE 3, in which the pairs of signals are situated on the same half-cycle of the sweep voltage $V_X$ and very closely together, whereby the separation between them is thus indiscernible to the observer, the signals in the method according to this invention are situated on different half-cycles of the sweep voltage $V_X$ (see FIGURE 5) whereby no adding of the signals occurs, and thus even very small differences in magnetic force can be recognized in the waveform E5 reproduced on the cathode ray tube.

It is of no concern, in principle, for the measuring of differences in magnetic force, whether the nuclear resonance magnetometer is preset to a frequency identical with the magnetic force $H_0$ between $H_1$ and $H_2$ or outside thereof. The separation $a$ of the signals $1'$, $2'$, or $1''$, $2''$, or $1$, $2$, respectively, is proportional to the difference in magnetic force in any case.

If, however, the amplitudes of the modulation fields $H_{M1}$, $H_{M2}$ are not identical, the separation $a$ of the signals $1'$, $2'$ is not equal to the separation $a$ of the signals $1''$, $2''$, as in FIGURE 4. The conditions resulting from inequality of signals $H_{M1}$ and $H_{M2}$ are explained in detail below with reference to FIGURE 6.

Figure 6:
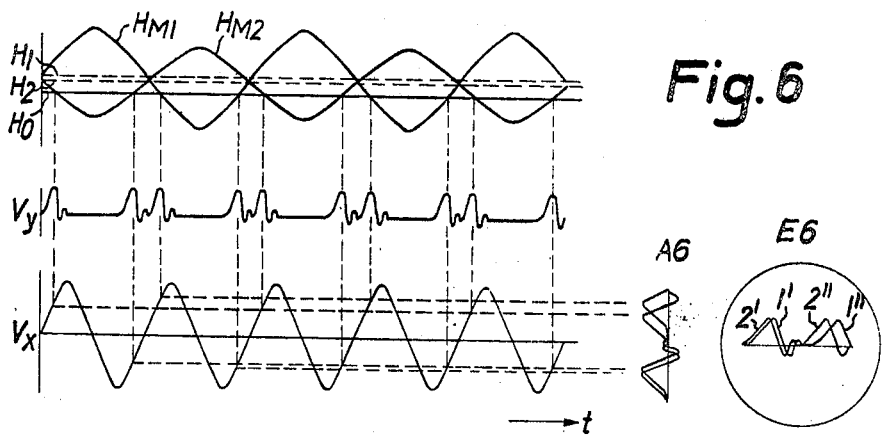
FIGURE 6 is a third set of waveforms illustratinng the measurement method and apparatus of this invention.

As can be seen in FIGURE 6, the amplitude of the modulation field $H_{M1}$ is larger that that of the modulation field $H_{M2}$. The nuclear resonance magnetometer is set corresponding to $H_0$. The separation of the signals $1''$, $2''$ of the waveform display E6 has decreased as compared to the separation $a$ of the signals $1''$, $2''$ of the waveform display E4 according to FIGURE 4, and the separation of the signals $1'$, $2'$ of the waveform display E6 according to FIGURE 6 has increased as compared to the separation $a$ of the signals $1'$, $2'$ according to FIGURE 4 by the same amount.

The waveform display E6 according to FIGURE 6 therefore indicates, based on the differing separation of the adjacent signals, that varying amplitudes of the modulation fields $H_{M1}$, $H_{M2}$ are present.

The evaluation of the waveform display E6 as regards the difference in magnetic force is complicated because of the differing separation of waveforms. This inequality of the separation can easily be corrected by setting the nuclear resonance magnetometer to a frequency identical to the magnetic force $H_0$ which is centered between $H_1$ and $H_2$, as shown in FIGURE 7. The signals $1'$, $2'$, and $1''$, $2''$ then sum up again to one signal 1, 2, each, as explained in connection with the waveform displays according to FIGURES 4 and 5. The differences in magnetic force can then simply be determined from the distance between these two signals.

The method according to the invention permits the measuring of differences in magnetic force so that the uniformity of magnetic fields can easily be tested without the requirement, as was previously the case, of an additional frequency meter, for example in the form of a counter. Furthermore, a time stability of the magnetic field to be measured is no longer necessary, so that the cost of the entire measuring apparatus is greatly reduced.

FIGURE 8 shows one illustrative apparatus of this invention. Two measuring probes 2 and 3 are arranged according to the invention between the pole pieces 1 of a magnet whose magnetic field is to be measured. The measuring probe 2 consists of a probe coil 4 and a field modulating coil 5. The measuring probe 3 also consists of a probe coil 6 and a field modulating coil 7. In the center of the probe coils 4 and 6, a nuclear probe substance, not numbered, is disposed. The coils 4 and 6 are components of the resonant circuit of a nuclear resonance oscillator 8. The field modulating coils 5 and 7 are fed by an A.C. signal generator 9 having, e.g., a frequency of 50 c.p.s. Signal generator 9 simultaneously generates the horizontal sweep voltage (e.g., at a frequency of 100 c.p.s.) for an oscilloscope 10 with a cathode ray tube 11.

As can be seen, the two probe coils 4 and 6 are connected in parallel and form the inductance of the resonant circuit of the nuclear resonance oscillator 8. If necessary, these coils 4 and 6 can, however, also be connected in series.

The two field modulating coils 5 and 7 are connected in series, but the windings of the two coils are arranged so that the modulation fields generated by these two coils are in phase opposition, as indicated in FIGURES 4 to 7. The coils 5 and 7 can also be connected in parallel. It is only essential that the modulation fields generated are 180° out of phase with each other.

A demodulator 12 is coupled to the output of oscillator 8 in a known manner, and the output of demodulator 12 is coupled to a low-frequency amplifier 13 whose output signals are applied to oscilloscope 10 and are displayed on the screen of cathode ray tube 11.

The waveforms displayed on the cathode ray tube with the method according to this invention produce both a quantitative and qualitative indication. The distance between adjacent signals in the waveform display constitutes a measure for the difference of magnetic force. If, for example, signals with a line width of 0.3 Oersted are present (FIGURE 5) and the distance between those signals is 1/10 of the line width, a difference in magnetic force of 30 mOersted results. To evaluate the waveform display E5 one has to more or less estimate, particularly when the differences in magnetic force are very small. With this very simple method a magnet can easily be adjusted for good field uniformity.

According to a further development of the invention, a better quantitative indication is achieved by biasing one of the field modulating coils from a D.C. bias current source or from an additional coil which is coupled to a D.C. source. With this direct current, the basic field of this modulating coil, and thus of the probe, can be varied. To aid in evaluation of the waveform display (e.g., E5 in FIGURE 5), the direct current is selected so that the two signals no longer differ in spacing, but rather coincide exactly. This adjustment can very sensitively be achieved by adjusting the direct current. This additional direct current adjustment, therefore, makes the distance between the two signals equal to zero. An ammeter disposed within the direct current circuit can be calibrated directly in values for differences of magnetic force. Thus, a very exact measurement can be achieved. In FIGURE 8, the above-described D.C. biasing circuit is indicated by D.C. source 15, switch 14, variable resistor 16, and milliammeter 17.

With the method according to this invention, two normal probes can be used as they have been known in the past, but it is also possible to use a single probe with two corresponding probe coils and two field modulating coils.

The 180° phase difference between the field modulating coils with two standard probes can be most easily achieved by placing one probe in the reverse direction in comparison to the other probe.

What is claimed is:

1. A method of measuring very small differences of magnetic field strength between two adjacent measuring locations with a nuclear resonance magnetometer comprising an oscillator having two probe coils coupled to the resonant circuit thereof, each of said probe coils, respectively, surrounding a nuclear probe substance, said method comprising the steps of:

(A) positioning each of the two probe coils in a corresponding one of the two adjacent measuring locations;

(B) positioning two magnetic field modulating coils at said two locations, respectively;

(C) energizing the magetic field modulating coils for producing two alternating magnetic modulation fields which are superimposed on the magnetic field to be measured and which are 180° out of phase with each other, each of said modulation fields, respectively, influencing a single one of said nuclear probe substances; and (D) sensing and displaying the resonance produced in said nuclear probe substances.

2. A nuclear resonance magnetometer for measuring very small differences of magnetic field strength between two adjacent measuring locations with a nuclear resonance magnetometer containing two probe coils, comprising, in combination:

(A) a high frequency oscillator having a resonant circuit with two probe coils coupled to said resonant circuit and forming a part thereof, said probe coils each having a nuclear probe substance therewithin and being positionable at two respective measurement locations;

(B) two magnetic field modulating coils which are positionable at said two respective measurement locations;

(C) means for energizing the magnetic field coils for producing two alternating magnetic modulation fields which are 180° out of phase with each other, each of said modulation fields, respectively, influencing a single one of said nuclear probe substances; and (D) means connected to said oscillator for indicating the time displacement between resonance peaks produced in said nuclear probe substances.

3. The apparatus defined in claim 2, further comprising a direct current bias source coupled to one of said field modulation coils for applying a direct current bias thereto, means for varying the current output of said direct current bias source, and means for measuring the current output of said direct current bias source.

4. The apparatus defined in claim 3 wherein said means for measuring the current output of said direct current bias source is directly calibrated in magnetic force values.

5. The method defined in claim 1, further comprising the steps of:
 (E) applying the output of the nuclear resonance magnetometer to a corresponding pair of deflection elements in the cathode ray tube of an oscilloscope;
 (F) synchronizing the sweep frequency of said oscilloscope with the frequency of said magnetic modulation fields; and
 (G) determining the difference of magnetic force between said two adjacent locations by measuring the distance between two adjacent waveforms on said cathode ray tube.

6. The method defined in claim 1, further comprising the steps of:
 (E) applying the output of said nuclear resonance magnetometer to a corresponding pair of deflection elements in the cathode ray tube of an oscilloscope;
 (F) synchronizing the sweep frequency of said oscilloscope with the frequency of said mangetic modulation fields;
 (G) applying a D.C. bias current to one of said two magnetic field modulating coils;
 (H) varying said D.C. bias current to produce coincidence between two adjacent waveforms on said cathode ray tube; and
 (I) determining the difference of magnetic force between said two adjacent locations by measuring the D.C. bias current required to produce coincidence between said two adjacent waveforms.

7. The method defined in claim 6 wherein the sweep frequency of said oscilloscope is synchronized at twice the frequency of said magnetic modulation fields.

8. The apparatus defined in claim 2, further comprising means, connected to said high frequency oscillator, for sensing resonances in said resonant circuit.

References Cited

UNITED STATES PATENTS

| | | | |
|---|---|---|---|
| 2,916,690 | 12/1959 | Leete | 324—0.5 |
| 2,975,360 | 3/1961 | Bell | 324—0.5 |
| 3,191,118 | 6/1965 | Jung | 324—0.5 |

OTHER REFERENCES

Silver, D. E. P.—A Differential Nuclear Magnetic Resonance Magnetometer—In Electronic Engineering—36(436) pp. 374–377—June 1964.

Freeman, R.—Measurement of Magnetic Field Contours—In Journal of Scientific Instruments— 38(8) pp. 318–321—August 1961.

RUDOLPH V. ROLINEC, Primary Examiner

MICHAEL J. LYNCH, Assistant Examiner